March 4, 1930. J. G. ROBERSON 1,749,674
AGRICULTURAL IMPLEMENT
Filed May 5, 1927
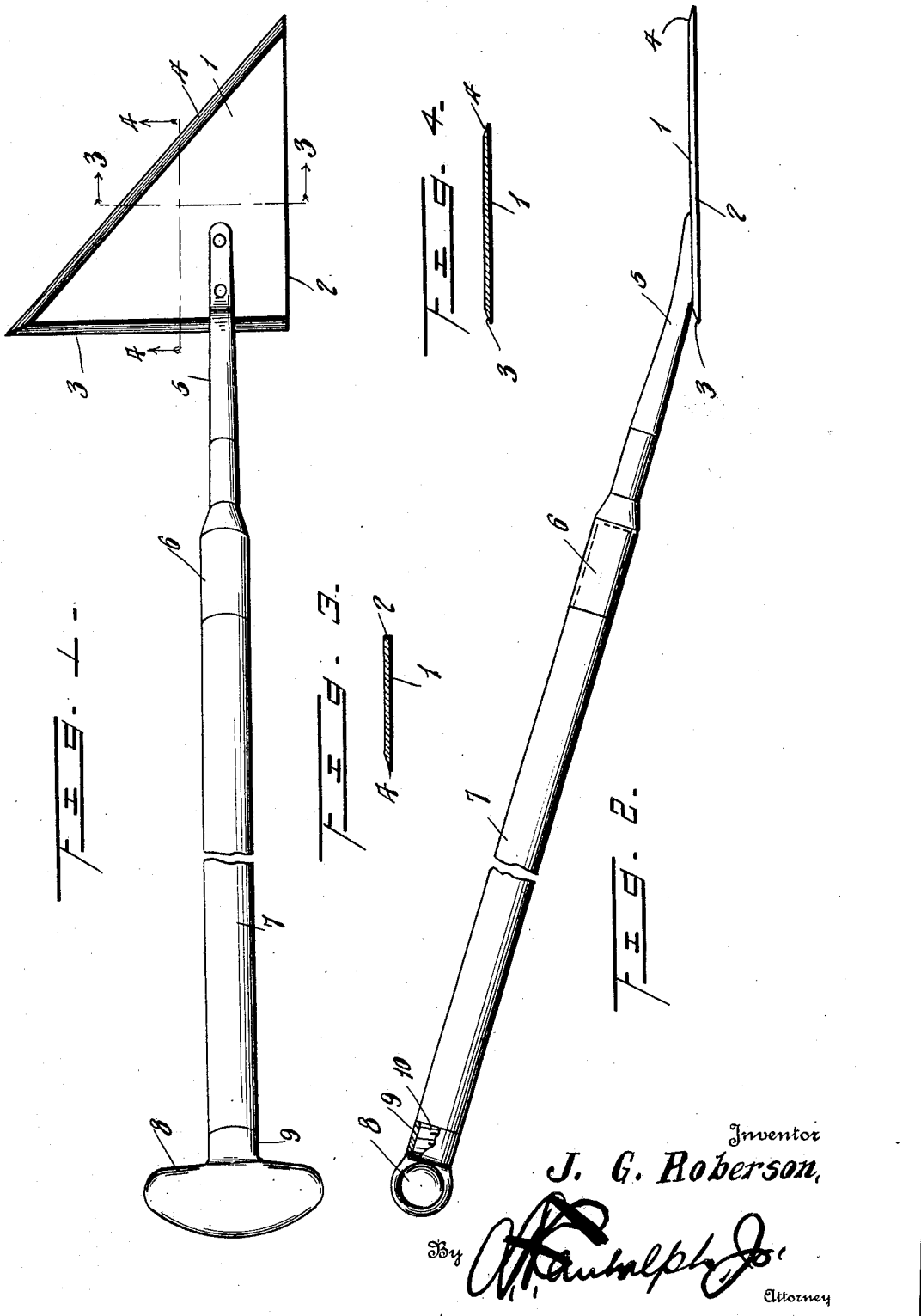

Patented Mar. 4, 1930

1,749,674

UNITED STATES PATENT OFFICE

JOSEPH G. ROBERSON, OF CORCORAN, CALIFORNIA

AGRICULTURAL IMPLEMENT

Application filed May 5, 1927. Serial No. 189,017.

The invention relates to an agricultural implement to be used for weeding and also for thinning growing plants, and has for its principal object the provision of an implement comprising a blade of triangular form having an unsharpened side edge, a rear edge at a right angle to the side edge, and a third edge connecting the extremities of the side and rear edges, the last two mentioned edges being sharpened to provide cutting edges so that the tool may be used for cutting out vegetation either by moving it away from the operator, or toward him, a handle being secured to the upper side of the blade and extending at an angle thereto and of sufficient length to enable use of the implement without stooping.

The invention will be described in detail hereinafter and will be found illustrated in the accompanying drawings in which Figure 1 is a top plan view of the implement, Figure 2, a side view, and Figures 3 and 4 sectional detail views of the blade on planes indicated by the lines 3—3, and 4—4, of Figure 1.

In the drawings similar reference characters will be used to designate corresponding parts throughout the several views.

The improved agricultural implement comprises a flat blade 1 made of any suitable material and of sufficient thickness to maintain the blade in its flattened condition. Said blade is triangular in shape, as shown, and has a side edge 2 that is unsharpened, a rear edge 3 at right angles to the side edge 2 and sharpened, and a third edge 4 connecting the extremities of the side and rear edges 2 and 3, and also sharpened. Secured to the upper side of the blade 1 is a handle shank 5, said shank being secured adjacent to the rear edge 3 and closer to the side edge 2 than to the outer extremity of said rear edge 3. A ferrule 6 is secured to the shank 5 to receive the end of the handle 7. Secured to the free end of the handle 7 is a T-shaped hand hold 8, having a threaded socket 9 engaging the threaded end 10 of the handle 7.

It will be apparent that the tool may be made in rights and lefts, by having the unsharpened side edge 2 on either side of the secured end of the shank 5, this feature being apparent and considered to be unnecessary to be illustrated.

In use, the implement may be used for cutting out weeds around growing plants and breaking up the top soil by shoving the blade 1 forwardly so that the edge 4 will cut into the soil and sever the roots of weeds or by moving the blade toward the operator when the rear edge 3 will serve to do the cutting while by moving the implement sidewise the pointed portion of the blade formed by the sharpened edges 3 and 4 may be used for thinning growing plants. The unsharpened side edge 2 is provided so that the implement may be used close to the plant being cultivated without endangering the plant. Also the implement may be used for cutting grass and weeds next to a wall or coping, the side edge 2 providing a guide for the implement by engaging the wall or coping in sliding the blade 1 back and forth.

What is claimed is:—

An agricultural implement, comprising a handle, a flat plate secured to said handle and forming a cutting blade, said plate being in the shape of a right angled triangle and secured to an end of the handle and at an acute angle to the axis thereof, the side of said plate corresponding to the base of the triangle being arranged transversely of the axis of the handle and sharpened and forming the rear edge of the blade, the side of the plate at right angles to the rear edge comprising one side of the blade and being unsharpened, and the remaining side of the plate being sharpened and joining the other sides forming sharp points directed forwardly and laterally of the handle.

In testimony whereof I affix my signature.

JOSEPH G. ROBERSON.